(12) United States Patent
Griess et al.

(10) Patent No.: US 11,007,726 B2
(45) Date of Patent: May 18, 2021

(54) FORMING COMPOSITE FEATURES USING STEERED DISCONTINUOUS FIBER PRE-PREG

(71) Applicant: The Boeing Company, Chicago, IL (US)

(72) Inventors: Kenneth H. Griess, Kent, WA (US); Derek Paul Vetter, Olympia, WA (US); Michael Jeffrey Graves, Seattle, WA (US)

(73) Assignee: The Boeing Company, Chicago, IL (US)

( * ) Notice: Subject to any disclaimer, the term of this patent is extended or adjusted under 35 U.S.C. 154(b) by 59 days.

(21) Appl. No.: 15/908,793

(22) Filed: Feb. 28, 2018

(65) Prior Publication Data

US 2018/0186099 A1 Jul. 5, 2018

Related U.S. Application Data

(62) Division of application No. 13/789,965, filed on Mar. 8, 2013, now abandoned.

(51) Int. Cl.
| | |
|---|---|
| *B29C 70/02* | (2006.01) |
| *B29C 70/14* | (2006.01) |
| *B29C 70/38* | (2006.01) |
| *B32B 5/32* | (2006.01) |
| *B29K 105/14* | (2006.01) |
| *B29K 105/26* | (2006.01) |
| *B29K 105/08* | (2006.01) |

(52) U.S. Cl.
CPC ............ *B29C 70/021* (2013.01); *B29C 70/14* (2013.01); *B32B 5/32* (2013.01); *B29C 70/38* (2013.01); *B29K 2105/0872* (2013.01); *B29K 2105/14* (2013.01); *B29K 2105/26* (2013.01); *Y10T 156/1322* (2015.01); *Y10T 428/24132* (2015.01)

(58) Field of Classification Search
CPC ....... B29C 70/021; B29C 70/14; B29C 70/38; B29K 2105/0872; B29K 2105/14; B29K 2105/26; B32B 5/32
See application file for complete search history.

(56) References Cited

U.S. PATENT DOCUMENTS

| | | | | |
|---|---|---|---|---|
| 3,574,040 A | * | 4/1971 | Chitwood et al. | .... B29C 70/386 156/522 |
| 4,212,216 A | | 7/1980 | Ives | |
| 4,806,298 A | | 2/1989 | Wilinson et al. | |
| 5,164,255 A | | 11/1992 | Weeks | |

(Continued)

FOREIGN PATENT DOCUMENTS

| | | |
|---|---|---|
| CA | 2898224 A2 | 6/2018 |
| CN | 101711230 A | 5/2010 |

(Continued)

OTHER PUBLICATIONS

Canadian Intellectual Property Office Examination Search Report, dated Dec. 13, 2018, regarding Application No. 3,004,233, 3 pages.

(Continued)

*Primary Examiner* — Christopher T Schatz
(74) *Attorney, Agent, or Firm* — Yee & Associates, P.C.

(57) ABSTRACT

Interlaminar features of a composite structure are laid up by placing and steering individual chopped fiber pre-preg segments onto a substrate.

20 Claims, 18 Drawing Sheets

(56) References Cited

U.S. PATENT DOCUMENTS

| | | | |
|---|---|---|---|
| 5,272,000 | A | 12/1993 | Chenoweth et al. |
| 5,380,477 | A | 1/1995 | Kent et al. |
| 6,182,332 | B1 * | 2/2001 | Jander .................. D01G 1/04 19/0.62 |
| 6,799,081 | B1 | 9/2004 | Hale et al. |
| 7,344,667 | B2 | 3/2008 | Honma et al. |
| 8,202,385 | B2 | 6/2012 | Martinez |
| 8,361,265 | B2 | 1/2013 | Wadahara et al. |
| 2005/0053787 | A1 | 3/2005 | Yamasaki et al. |
| 2005/0056362 | A1 | 3/2005 | Benson et al. |
| 2007/0175572 | A1 * | 8/2007 | Rubin .................. B29C 70/545 156/196 |
| 2009/0202763 | A1 | 8/2009 | Rose et al. |
| 2009/0261199 | A1 | 10/2009 | McCarville et al. |
| 2009/0266485 | A1 * | 10/2009 | Torres Martinez ..... B29C 70/38 156/324 |
| 2010/0028593 | A1 | 2/2010 | Taketa et al. |
| 2010/0178495 | A1 | 7/2010 | Taketa et al. |
| 2011/0086566 | A1 | 4/2011 | Goering et al. |
| 2012/0027989 | A1 | 2/2012 | Nishiyama et al. |
| 2012/0328819 | A1 | 12/2012 | Motohashi et al. |
| 2014/0216638 | A1 | 8/2014 | Vetter et al. |
| 2014/0255646 | A1 | 9/2014 | Griess et al. |

FOREIGN PATENT DOCUMENTS

| | | | |
|---|---|---|---|
| DE | 3541073 | A1 | 5/1986 |
| EP | 2964451 | A2 | 1/2016 |
| JP | S58193117 | A | 11/1983 |
| JP | S61130009 | A | 6/1986 |
| JP | H03236910 | A | 10/1991 |
| JP | 2008057849 | A1 | 12/2008 |
| JP | 2011501763 | A | 1/2011 |
| JP | 2011161808 | A | 8/2011 |
| WO | 2004030897 | A1 | 4/2004 |
| WO | WO2014137568 | A2 | 9/2014 |

OTHER PUBLICATIONS

Feraboli, "Notched response of OSB wood composites," Elsevier Ltd., Composites: Part A, copyright 2008, pp. 1355-1361.

Feraboli et al., "Characterization of Prepreg-Based Discontinuous Carbon Fiber/Epoxy Systems," Journal of Reinforced Plastics and Composites, vol. 28, No. 10, Oct. 2009, pp. 1191-1214.

PCT International Search Report dated Sep. 12, 2014, regarding Application No. PCT/US2014/016533, 16 pages.

State Intellectual Property Office of PRC, Notification of Third Office Action and English translation, dated Oct. 10, 2017, regarding Application No. 201480009859.7, 20 pages.

State Intellectual Property Office of PRC, Notification of the Decision of Rejection and English translation, dated May 3, 2018, regarding Application No. 201480009859.7, 20 pages.

Japanese Notice of Reasons for Rejection and English translation, dated Mar. 27, 2018, regarding Application No. 2015561637, 9 pages.

Office Action, dated Sep. 12, 2014, regarding U.S. Appl. No. 13/789,965, 14 pages.

Final Office Action, dated Jan. 20, 2015, regarding U.S. Appl. No. 13/789,965, 13 pages.

Final Office Action, dated Mar. 17, 2016, regarding U.S. Appl. No. 13/789,965, 6 pages.

Brazillian Office Action with English translation, dated Dec. 3, 2019, regarding Application No. 112015019511, 6 pages.

European Patent Office Examination Report, dated Jan. 28, 2020, regarding Application No. 14707580.8, 4 pages.

Korean Intellectual Property Office Notice of Office Action with English translation, dated Dec. 10, 2019, regarding Application No. 10-2015-7022015, 16 pages.

Chinese Intellectual Property Office Action, with English Translation, dated Feb. 6, 2020 regarding Chinese Patent Application No. 201610605799.6; 17 pgs.

Mexican Office Action with English translations dated Dec. 1, 2020 regarding Application No. MX/a/2015/010813, 8 pages.

Brazilian Office Action with machine English translations dated Nov. 24, 2020, regarding Application No. BR112015019511-3; 13 pages.

* cited by examiner

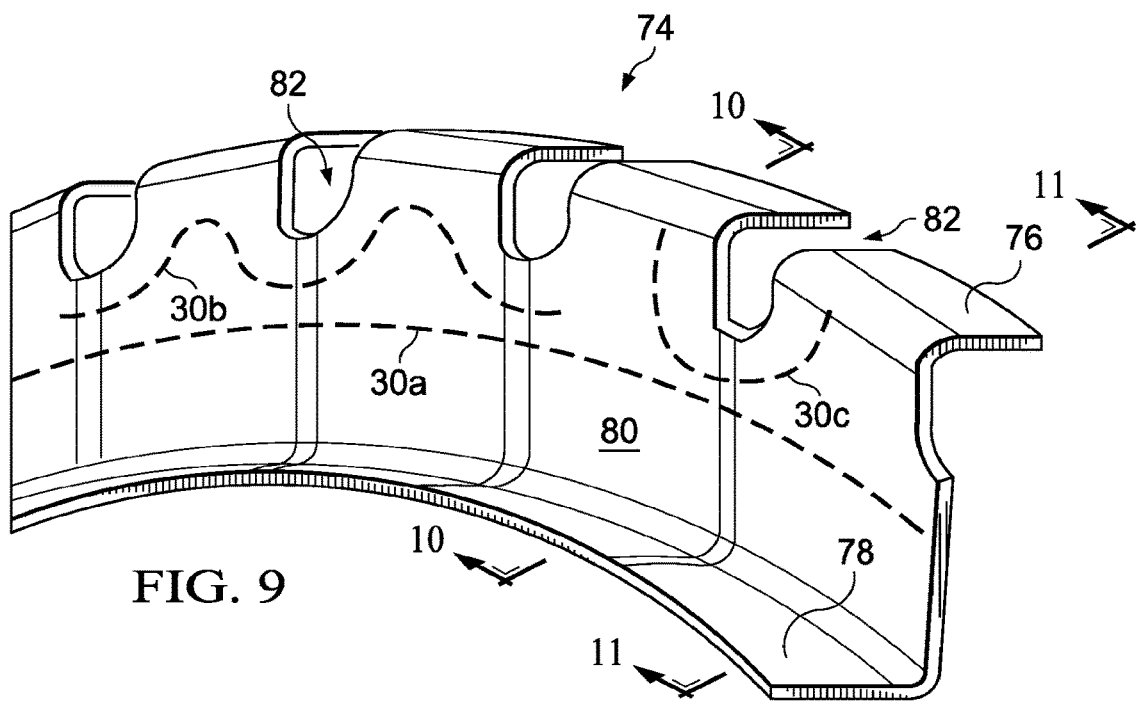
FIG. 9
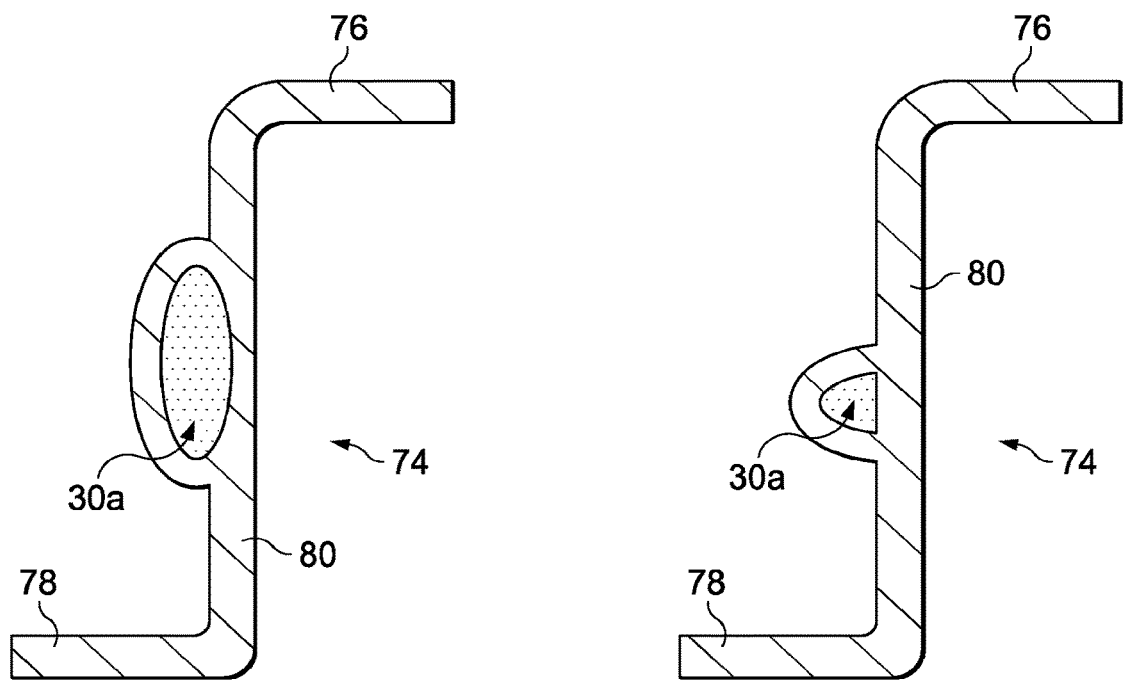
FIG. 10
FIG. 11

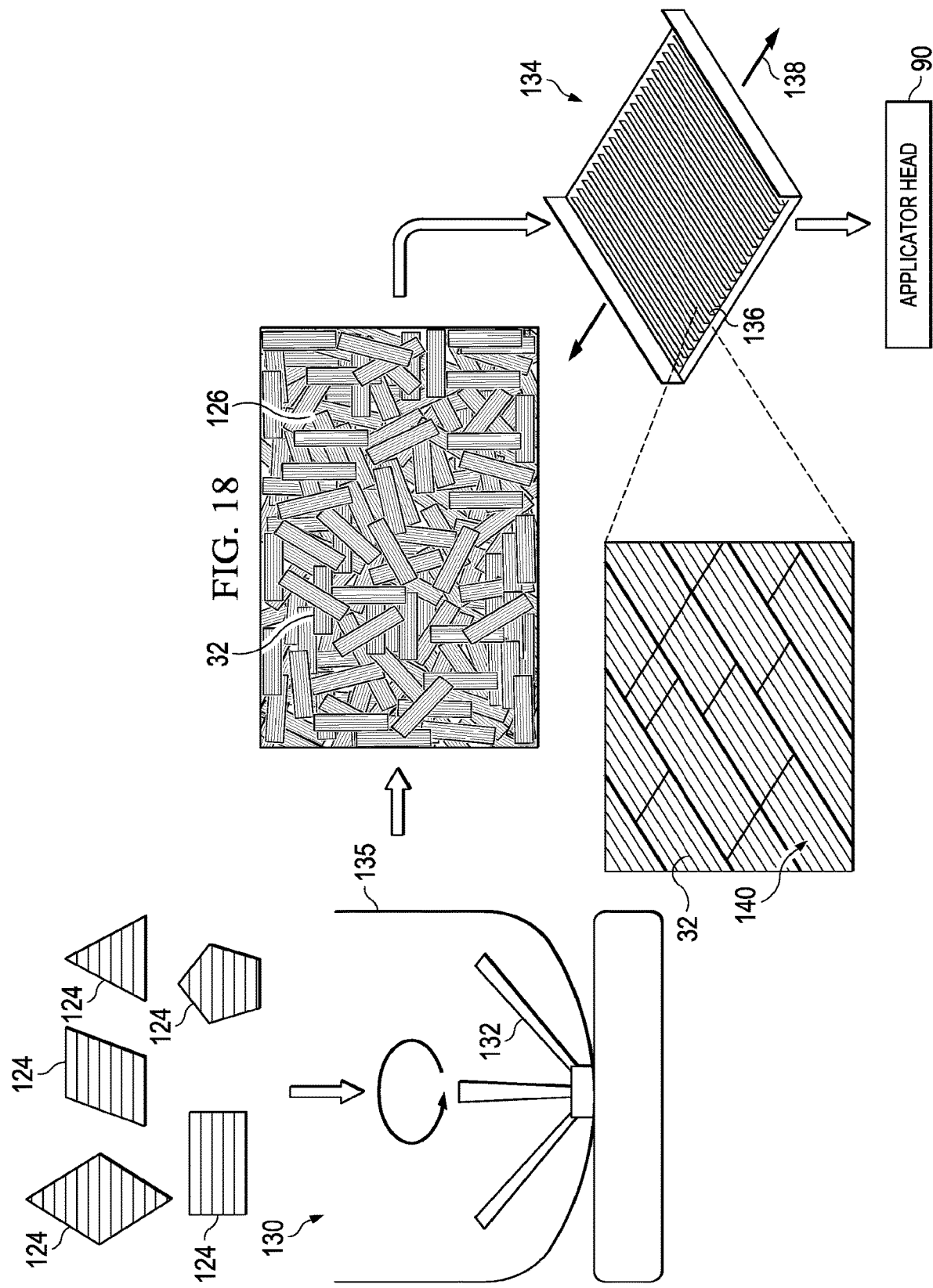

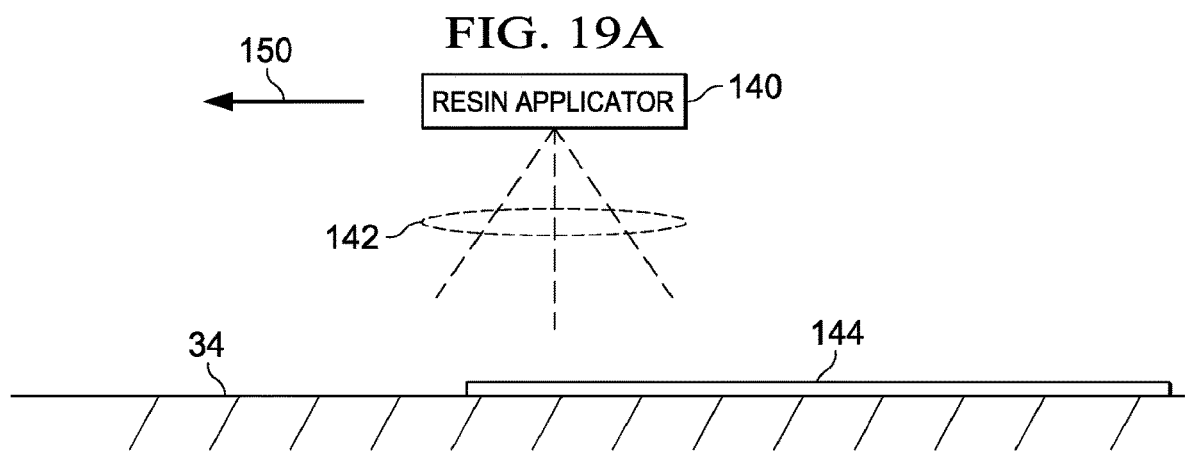
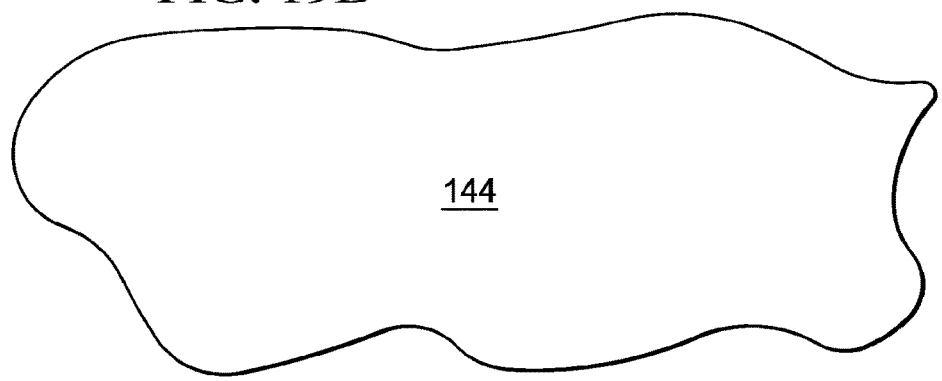
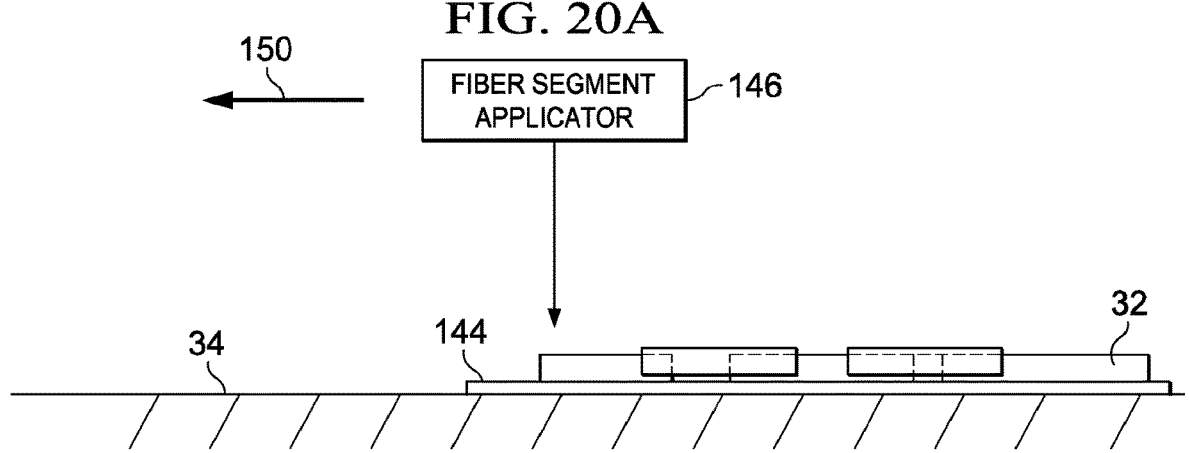

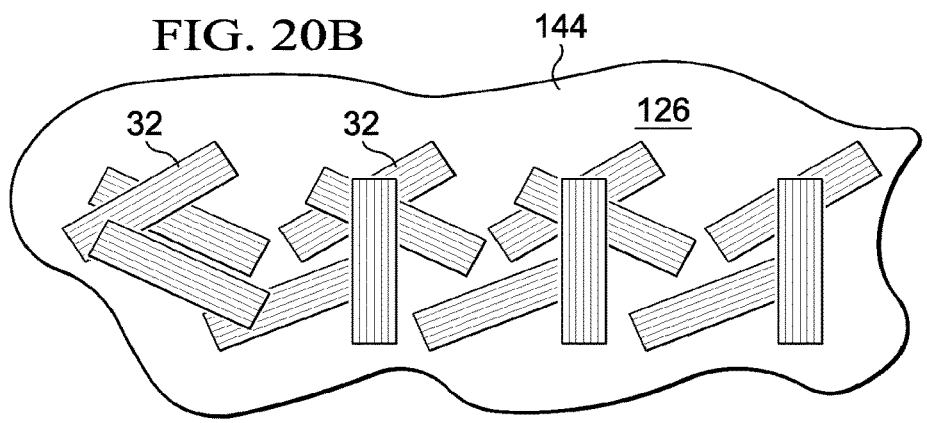
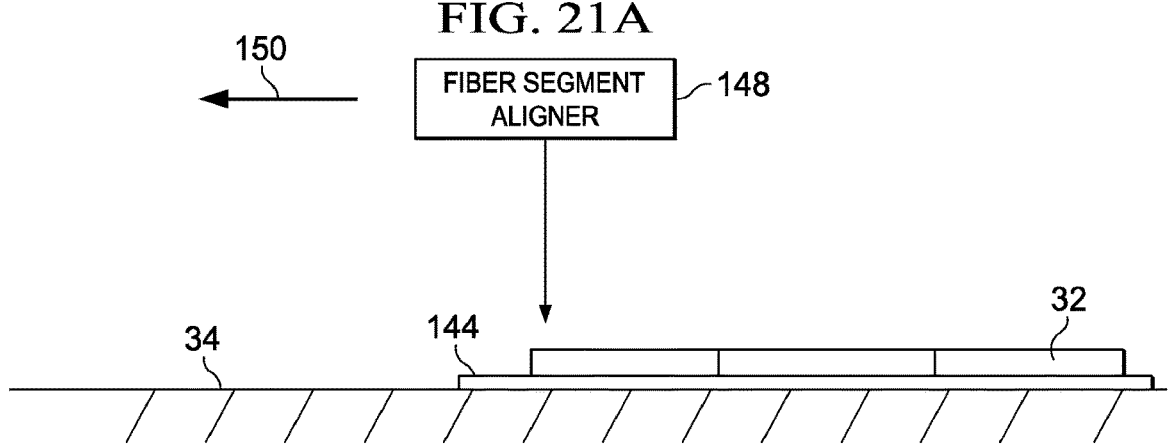
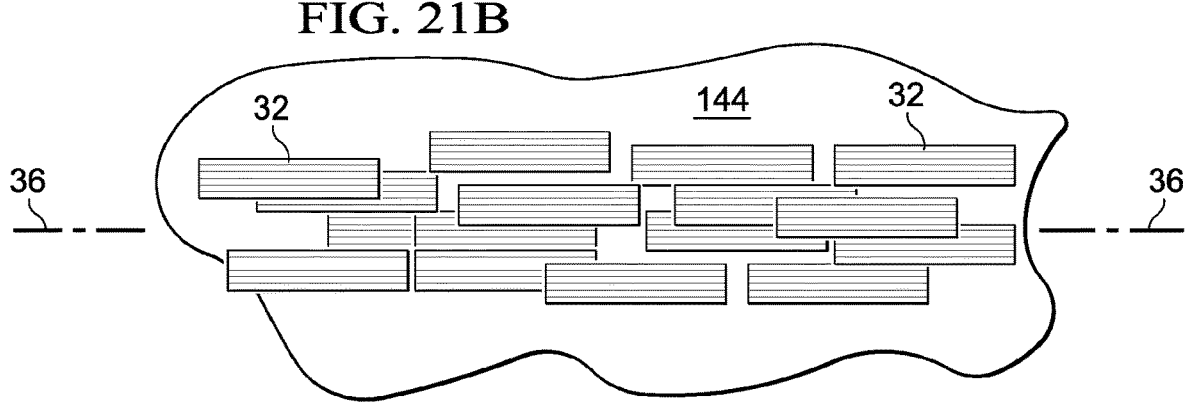

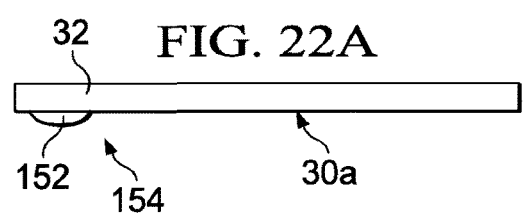
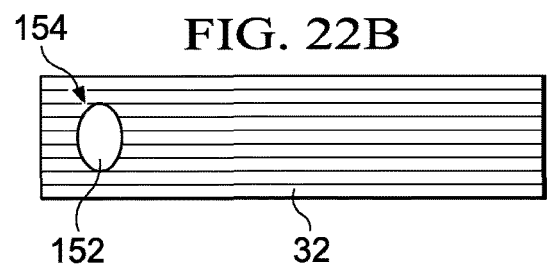
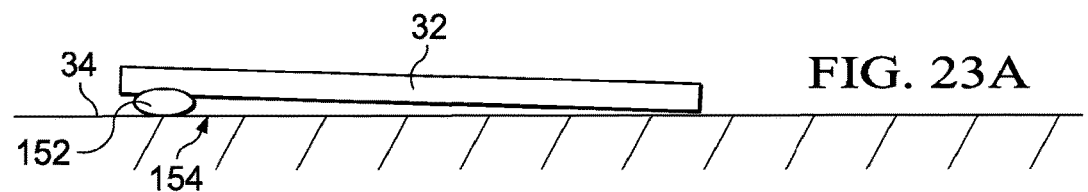
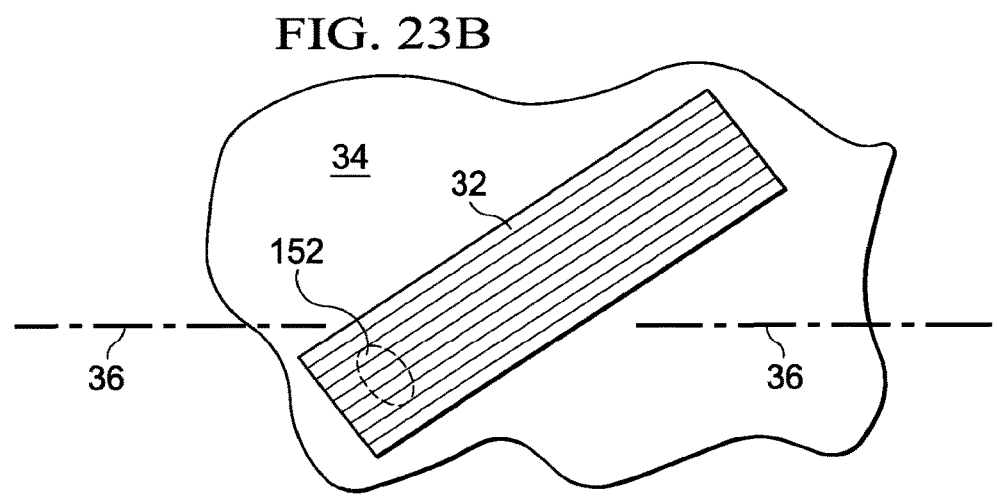

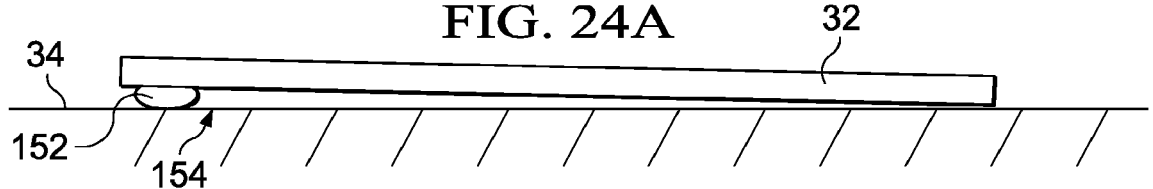
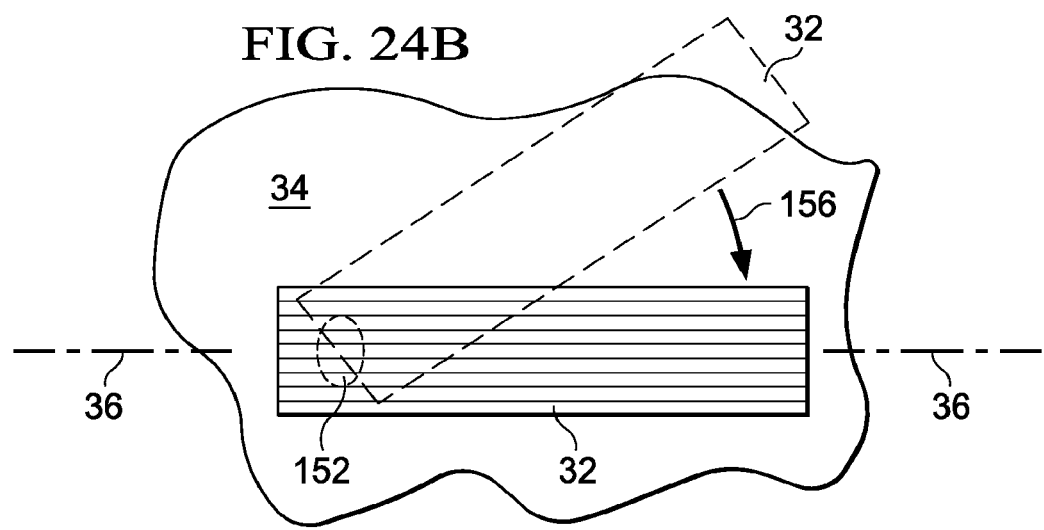

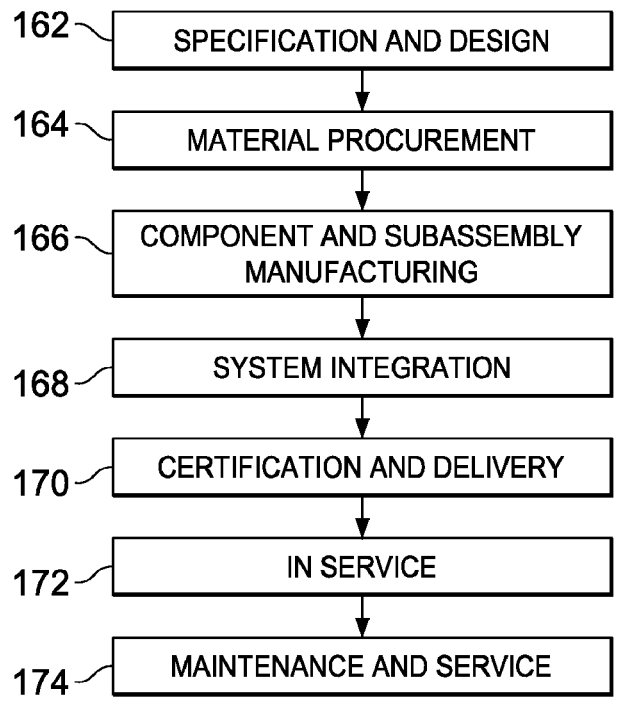
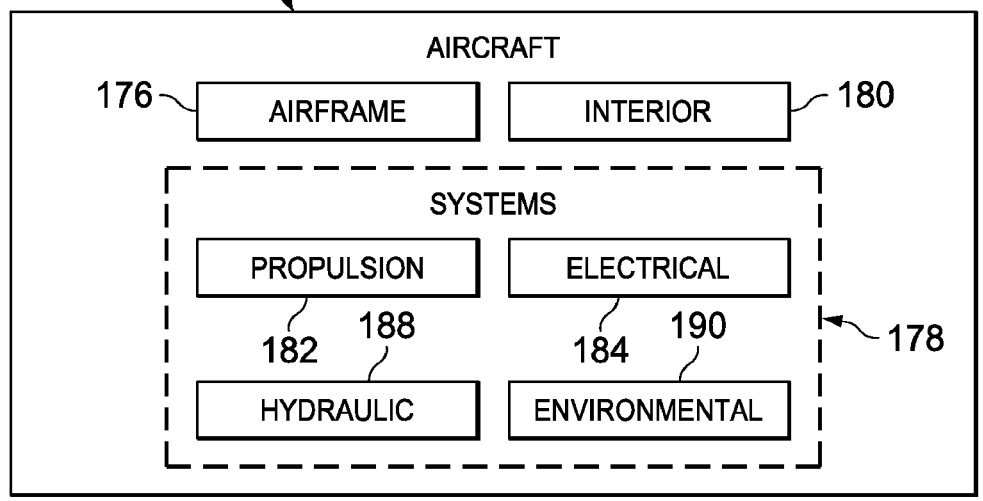

FORMING COMPOSITE FEATURES USING STEERED DISCONTINUOUS FIBER PRE-PREG

This application is a divisional application of U.S. application Ser. No. 13/789,965, filed Mar. 8, 2013.

BACKGROUND INFORMATION

1. Field

The present disclosure generally relates to fabrication of composite laminate structures using fiber pre-preg, and deals more particularly with a method and apparatus for forming composite structural features by steering discontinuous fiber pre-preg onto a substrate with desired fiber orientations.

2. Background

The strength, stiffness and load transfer characteristics of a composite laminate structure may be optimized through control of fiber orientation during the layup process. Conventional composite laminates may be laid up using pre-preg tapes, tows or broad goods, employing either automated fiber placement equipment or hand placement techniques to layup the material. Generally, the resulting composite structure exhibits substantially consistent structural properties throughout. In some cases, however, it may be necessary or desirable to control the thickness and/or fiber orientation in local areas of a composite laminate in order to optimize its structural properties and/or account for higher local stresses.

The ability to control local thickness/fiber orientation is limited using current fabrication processes. For example, automated fiber placement equipment may be used to steer continuous tows onto the substrate, but the radius of curvature that can be achieved is limited, thus making control of fiber orientation difficult in local areas having tight contours. Achieving close control over thickness and/or fiber orientation in local areas of laminate may also be costly and time-consuming.

Accordingly, there is a need for a method and apparatus for controlling composite laminate thickness and/or fiber orientation in local areas of a laminate in order to optimize the laminate's structural properties. There is also a need for a method and apparatus of the type mentioned above which is efficient, highly controllable and which may reduce labor and material costs.

SUMMARY

The disclosed embodiments provide a method and apparatus for fabricating composite features of laminates which provide increased control over feature thickness and/or fiber orientation in local areas of a laminate structure, such as in tight contours and/or within transitions in laminate thickness. Composite material may be laid up such that fiber orientations are substantially continuously aligned with load vectors in selected local areas of a laminate, thereby optimizing the laminate's structural properties.

The amount of composite material required to provide local areas of a laminate structure with desired structural properties may be reduced by forming the composite features using scrap pre-preg derived from other products/processes. Recycling of scrap pre-preg for use in the disclosed method may reduce material costs, thus optimizing the buy-to-fly ratio (the ratio of materials weight procured to the weight of the finished product) for aircraft applications of the embodiments. The embodiments allow composite material in the form of discontinuous fiber pre-preg to be "steered" onto a substrate in order to achieve desired fiber orientations.

The use of discontinuous fiber pre-preg allows greater control over laminate thickness variations in local areas of the laminate, while allowing local tailoring of laminate thickness in three dimensions to provide smooth transitions between differing features of a laminate structure. Moreover, the use of discontinuous fiber pre-preg permits the formation of doublers or other pad-ups having tight contours and/or tapered edges to achieve smooth load transitions within a structure. Also, the use of discontinuous fiber pre-preg may result in composite features having a higher fiber content.

According to one disclosed embodiment, a method is provided of forming a composite feature having discontinuous reinforcement fibers. The method comprises producing a plurality of resin infused fiber segments each having unidirectional reinforcing fibers, placing the resin infused fiber segments on a substrate, and arranging the resin infused fiber segments such that the reinforcing fibers of resin infused fiber segments placed on the substrate are substantially aligned relative to a desired reference orientation. Producing the resin infused fiber segments includes chopping scrap fiber pre-preg into individual pieces, which may be performed by breaking or splitting fiber pre-preg along and between the reinforcing fibers into individual pieces. Placing the resin infused fiber segments on the substrate includes moving an applicator over the substrate, and dispensing the resin infused fiber segments from the applicator onto the substrate as the applicator moves over the substrate. Arranging the resin infused fiber segments includes aligning the resin infused fiber segments as they are being dispensed from the applicator onto the substrate. Producing the resin infused fiber segments is performed by drawing continuous fiber pre-preg tape from the applicator, and chopping the pre-preg tape into the resin infused fiber segments as the resin infused fiber segments are being dispensed from the applicator onto the substrate. Dispensing the resin infused segments from the applicator includes dispensing a bandwidth of the resin infused fiber segments onto the substrate. Placing the resin infused fiber segments on the substrate is of performed by streaming the resin infused fiber segments from an applicator head onto the substrate. Streaming the resin infused fiber segments is performed by introducing the resin infused fiber segments into an airstream, and using the airstream to project the resin infused fiber segments onto the substrate. Arranging the resin infused fiber segments is performed after the resin infused fiber segments have been placed on the substrate. The method may further comprise applying resin to the substrate before the resin infused segments are placed on the substrate. The method may also comprise applying a resin on at least one end of each of the resin infused fiber segments before they are placed on the substrate.

According to another disclosed embodiment, a method is provided of laying up composite material on a substrate the method comprises placing individual chopped fiber pre-preg segments on the substrate, and controlling the orientation of the pre-preg segments on the substrate. Placing the pre-preg segments on the substrate is performed by moving an applicator head over the substrate along a desired path, and dispensing the pre-preg segments from the applicator head onto the substrate as the applicator moves over the substrate. Controlling the orientation of the pre-preg segments is performed by aligning the pre-preg segments being dispensed from the applicator head. Controlling the orientation of the pre-preg segments includes changing the orientation of the pre-preg segments after the pre-preg segments have been placed on the substrate.

According to still another embodiment, a composite laminate structure layup is provided comprising a plurality of layers of composite material, each of the layers including a plurality individual chopped fiber pre-preg segments having aligned fiber orientations. The fiber orientations of the chopped fiber pre-preg segments are substantially aligned with a non-linear load path through the composite laminate structure. Each of the individual chopped fiber pre-preg segments may have an aspect ratio of approximately 6:1. The plurality of layers of composite material have a tailored cross-sectional shape and is contoured along a length of the layup.

According to still another disclosed embodiment, apparatus is provided for laying up a composite structure. The apparatus comprises an applicator adapted to move over the surface of a substrate, and dispense at least one stream of substantially aligned chopped, resin infused fiber segments onto the surface of a substrate. The apparatus may also comprise a computer controlled manipulator for moving the applicator along a preselected path over the substrate. The applicator includes a supply of continuous resin infused fiber, and a chopper for chopping the continuous resin infused fiber into individual resin infused fiber segments. Applicator may further include an airstream generator for carrying the resin infused fiber segments from the applicator onto the substrate. The applicator may be adapted to simultaneously dispense multiple streams of substantially aligned chopped, resin infused fiber segments onto the substrate. The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 9 is an illustration of a perspective view of a portion of an aircraft fuselage frame section, broken lines indicating areas where interlaminar structural features may be formed using the disclosed method.

FIG. 10 is an illustration of a sectional view taken along the line 10-10 in FIG. 9 showing an interlaminar structural feature formed using the disclosed method.

FIG. 11 is an illustration of a sectional view taken along the line 11-11 in FIG. 9.

FIG. 18 is an illustration of a diagrammatic view of a method of converting fiber pre-preg scrap into segments and readying it for application to a substrate.

FIG. 19A is an illustration of a diagrammatic side view of an applicator applying resin onto a substrate.

FIG. 19B is an illustration of a plan view of the resin applied to the substrate shown in FIG. 19A.

FIG. 20A is an illustration of a diagrammatic side view showing chopped fiber pre-preg segments being applied over the resin shown in FIG. 19B.

FIG. 20B is an illustration of a plan view of the substrate in FIG. 20A, showing the random orientation of the chopped fiber pre-preg segments.

FIG. 21A is an illustration of a diagrammatic side view showing the fiber segment aligner aligning the chopped fiber pre-preg segments.

FIG. 21B is an illustration of a plan view showing the chopped fiber pre-preg segments of FIG. 21A having been aligned by the fiber segment aligner.

FIG. 22A is an illustration of a side view of a chopped fiber pre-preg segment with a drop of resin having been placed on one end thereof.

FIG. 22B is an illustration of a bottom view of the chopped fiber pre-preg segment shown in FIG. 22A.

FIG. 23A is an illustration of a side view of the chopped fiber pre-preg segment of FIG. 22A having been placed on a substrate, but prior to rotation thereof.

FIG. 23B is an illustration of a plan view of the chopped fiber pre-preg segment shown in FIG. 23A.

FIG. 24A is an illustration of a side view, similar to FIG. 23A, but after the chopped fiber pre-preg segment has been rotated.

FIG. 24B is an illustration similar to FIG. 23B, but showing the fiber pre-preg segment having been rotated, the position of the chopped fiber pre-preg segment before rotation being indicated in the phantom.

FIG. 25 is an illustration of a flow diagram of aircraft production and service methodology.

FIG. 26 is illustration of a block diagram of an aircraft.

DETAILED DESCRIPTION

Figure 1:
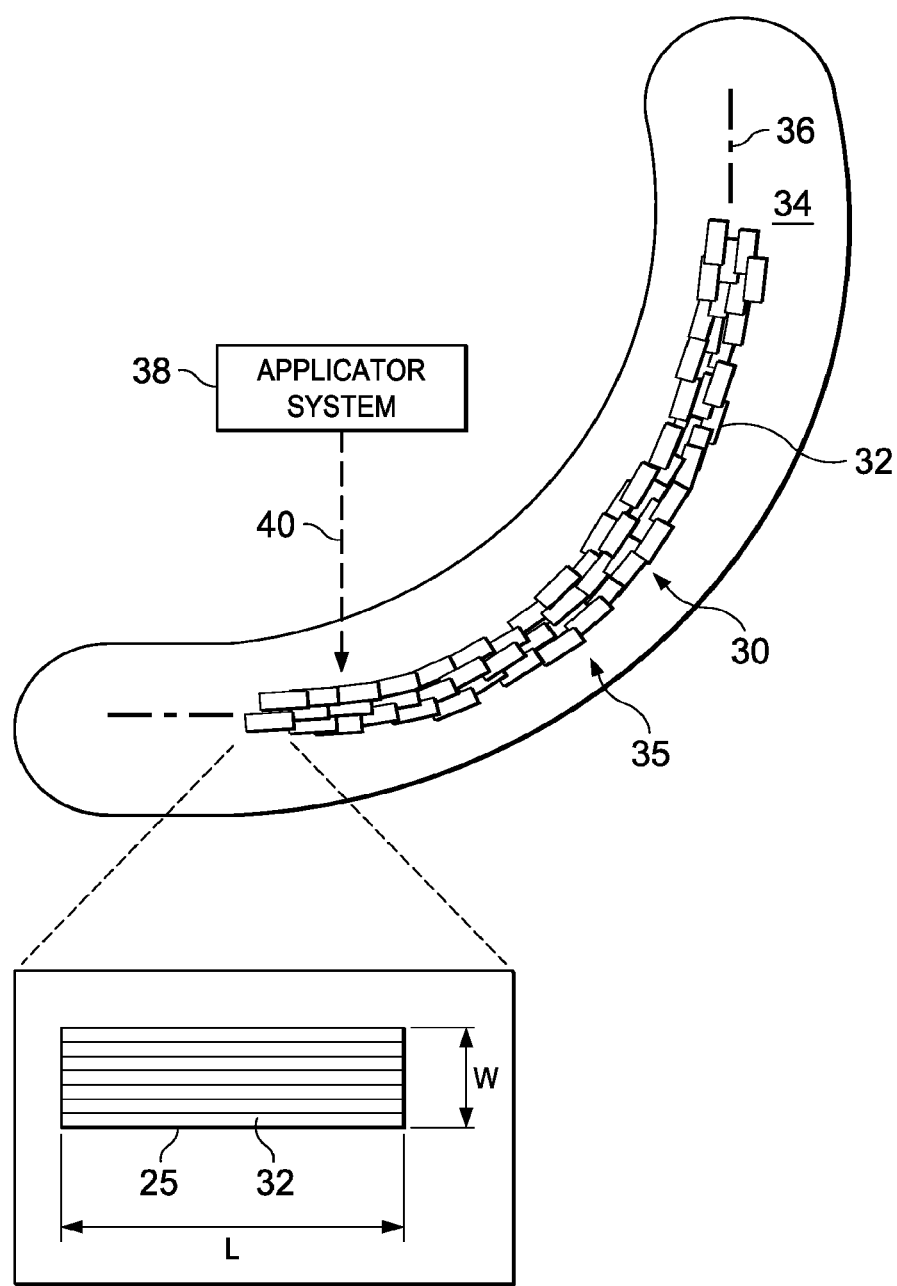
FIG. 1 is an illustration of a combined block and diagrammatic of discontinuous fiber pre-preg being applied to a substrate along a tight contour.

The disclosed embodiments provide a method and apparatus for fabricating fiber reinforced resin laminates which provide increased control over laminate thickness, contour, width, cross-sectional profile and/or fiber orientation in local areas of a laminate structure. Referring to FIG. 1, a composite feature 30 comprises discontinuous, resin infused fibers which may be in the form of chopped fiber pre-preg segments 32 having unidirectional reinforcing fibers 25. Each of the fiber pre-preg segments 32 is elongate, having a length L that is greater than its width W. Each of the fiber pre-preg segments 32 may have an aspect ratio (L/W) in the range of approximately 6:1, however this particular ratio is merely illustrative. The fiber pre-preg segments 32 may have other aspect ratios that are selected and/or optimized for the application, including structural requirements and the equipment used to position or place the segments 32. In some embodiments, the fiber pre-preg segments 32 may have a length that is equal to or less than its width. For convenience and ease of description, the illustrative examples of composite features 30 that will be discussed below utilize unidirectional fiber pre-preg. However, it should be noted here that the principals of the disclosed embodiments may be employed to form composite features 30 using other types of pre-preg segments 32, including resins that are reinforced with fibers having multiple fiber orientations, such as, for example and without limitation, bidirectional fibers that are woven (cloth pre-preg) or otherwise combined in a manner to suit the particular application.

Figure 1A:
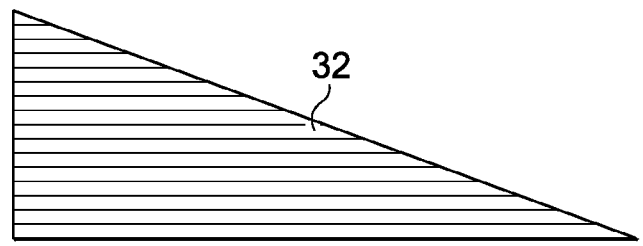
FIG. 1A is an illustration of a plan view showing one shape of the pre-preg segments.
Figure 1B:
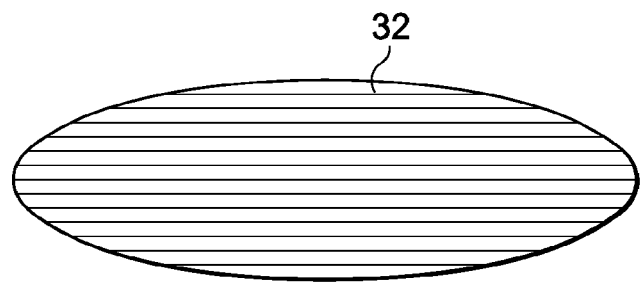
FIG. 1B is an illustration of a plan view showing another shape of the pre-preg segments.
Figure 1C:
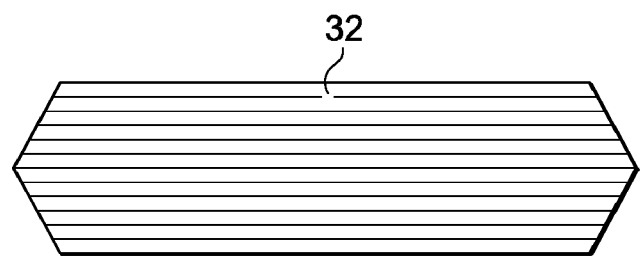
FIG. 1C is an illustration of a plan view showing a further shape of the pre-preg segments.

The disclosed embodiments are particularly well-suited for forming any of a variety of interlaminate features 30, i.e. features 30 that are located between two continuous plies. However, the embodiments may also be employed to form composite features 30 that are partially or fully exposed, such as external features. In some applications, it may be useful or desirable to employ pre-preg segments 32 having fibers of differing lengths. Differing fiber lengths in a segment 32 may be achieved by, for example and without limitation, shaping the segment 32, such as by chopping, in a manner that results in some of the fibers being longer or shorter than other fibers. Three illustrative examples of pre-preg segments 32 having shapes configured to produce reinforcing fibers of differing lengths are respectively shown in FIGS. 1A-1C. Other segment shapes resulting in differing fiber lengths are possible. As previously mentioned, while the pre-preg segments 32 shown in FIGS. 1A-1C employ unidirectional reinforcing fibers, other fiber arrangements are possible, such as a woven fibers (not shown).

The reinforcing fibers 25 may comprise high-strength fibers, such as glass or carbon fibers, graphite, aromatic polyamide fiber, fiberglass, or another suitable reinforcement material. The resin matrix in which the fibers 25 are held may comprise thermoplastic or thermoset polymeric resins. Exemplary thermosetting resins may include allyls, alkyd polyesters, bismaleimides (BMI), epoxies, phenolic resins, polyesters, polyurethanes (PUR), polyurea-formaldehyde, cyanate ester, and vinyl ester resin. Exemplary thermoplastic resins may include liquid-crystal polymers (LCP); fluoroplastics, including polytetrafluoroethylene (PTFE), fluorinated ethylene propylene (FEP), perfluoroalkoxy resin (PFA), polychlorotrifluoroethylene (PCTFE), and polytetrafluoroethylene-perfluoromethylvinylether (MFA); ketone-based resins, including polyetheretherketone; polyamides such as nylon-6/6, 30% glass fiber; polyethersulfones (PES); polyamideimides (PAIS), polyethylenes (PE); polyester thermoplastics, including polybutylene terephthalate (PBT), polyethylene terephthalate (PET), and poly(phenylene terephthalates); polysulfones (PSU); or poly(phenylene sulfides) (PPS).

As used herein, "pre-preg" means fibers that have been impregnated with an uncured or partially cured resin which acts as a matrix to hold the fibers and which is flexible enough to be formed into a desired shape. The resin is then "cured," e.g., by the application of heat in an oven or an autoclave, to harden the resin into a strong, rigid, fiber-reinforced structure. In the case of pre-preg segments 32 having unidirectional fibers, the fibers extend substantially parallel to each other and, for purposes of this description, have a 0° axial orientation, referred to hereinafter as the fiber direction or orientation of the pre-preg segments 32. Where pre-preg segments 32 are used that have multiple sets of fiber orientations, typically the fiber orientations of one or more of these sets will be used in aligning and orienting the segments 32 as they are being placed on a substrate 34 during the layup process.

The fiber pre-preg segments 32 may be laid up on a substrate 34 that may comprise a tool or an underlying continuous composite ply, using a suitable applicator system 38 which "steers" the fiber pre-preg segments 32 onto the substrate 34. The applicator system dispenses, places and aligns the fiber pre-preg segments 32 on the substrate 34 such that the direction of the fibers 25 in each of the fiber pre-preg segments 32 is substantially aligned in a desired orientation. For example, in the example shown in FIG. 1, the fiber orientations of the fiber pre-preg segments 32 are substantially aligned with a curved center axis 36 forming a relatively tight contour 35, with the fiber orientations of the segments 32 changing in direction along the contour 35 to remain substantially aligned in a desired orientation relative to the center axis 36. The degree to which a chosen set of the fiber orientations of the pre-preg segments 32 are aligned with respect to a desired orientation, direction, or axis will depend upon the application. In some applications, the orientations of the pre-preg segments 32 may vary to some extent at one or more locations of a composite feature 30. In fact, in some applications, some degree of variation of pre-preg segment orientation relative to a desired, reference orientation may be useful or desirable within a specified tolerance of variation.

In one embodiment, the applicator system 38 dispenses a serial stream 40 of pre-aligned fiber pre-preg segments 32, which are then steered and placed onto substrate 34 by moving an applicator head (not shown) forming part of the applicator system 38 in a desired path over the substrate 34, which in the illustrated example, is along, or parallel to the center axis 36. Repeated passes of the applicator head over the substrate 34 result in successive layers or plies being laid up, each comprising aligned fiber pre-preg segments 32. Thus, the composite feature 30 comprises multiple layers or plies of discontinuous fibers infused with resin.

Although not shown in FIG. 1, as will become apparent later in the description, the disclosed embodiments may also be employed to fill voids or gaps (not shown) in composite structures as well as to form transitions (not shown) in laminate thicknesses by steering resin infused, discontinuous fibers such as chopped fiber pre-preg onto a substrate. By continuously steering the orientation of the fiber pre-preg segments 32 as they are being placed, structural properties of the laminate may be closely controlled on a local basis and therefore optimized. These void or gap fillers, as well as features such as bulk doubler areas that include transitions in laminate thicknesses will typically be interlaminar features (located between continuous plies), however in some applications as previously mentioned, it is possible that they may be exposed, external features.

Figure 2:
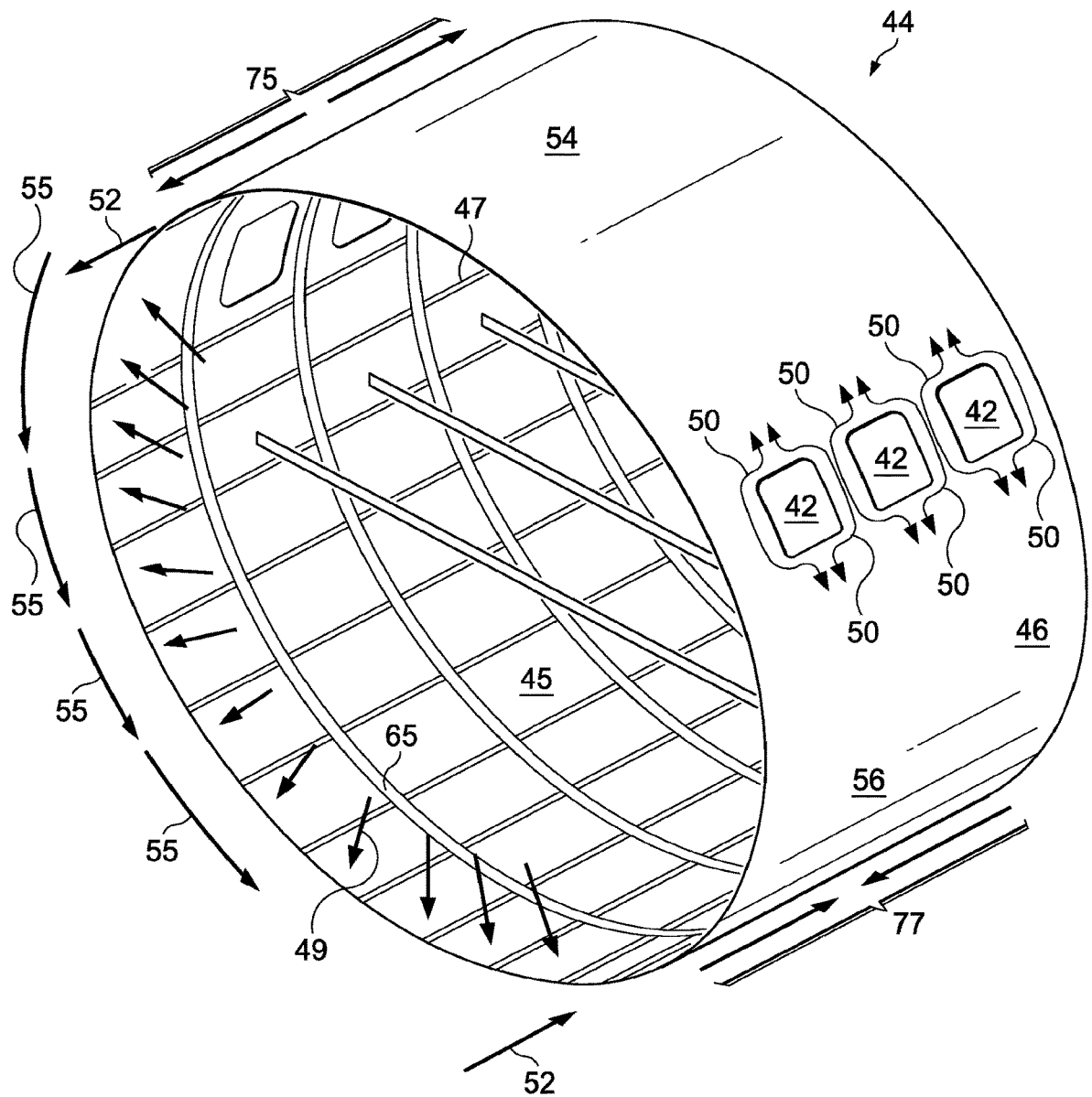
FIG. 2 is an illustration of a perspective view of a barrel section of an aircraft fuselage showing loads applied to the fuselage.
Figure 3:
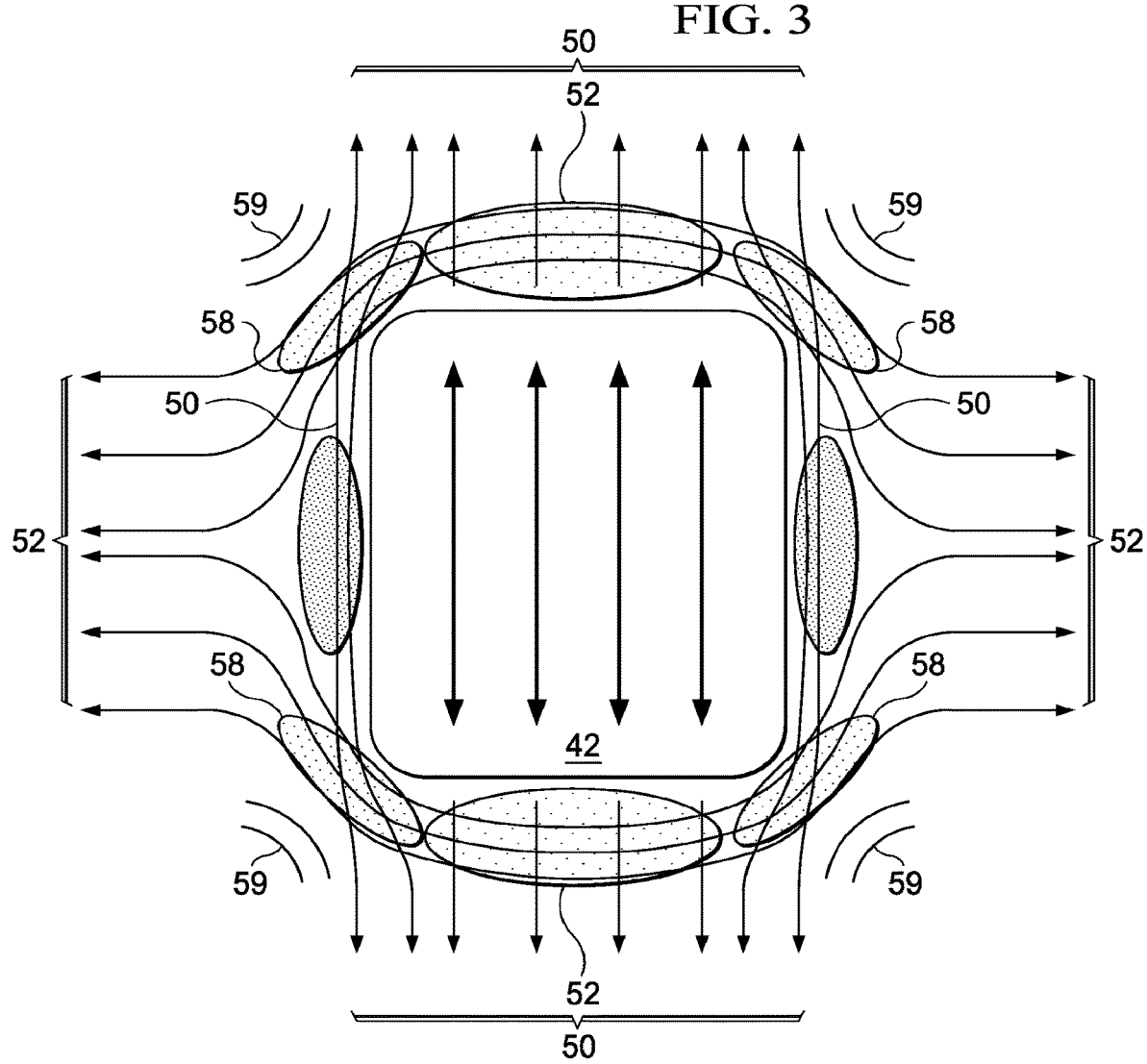
FIG. 3 is an illustration of a diagrammatic view of one of the window openings in the fuselage of FIG. 2, also showing load vectors around the window opening.
Figure 4:
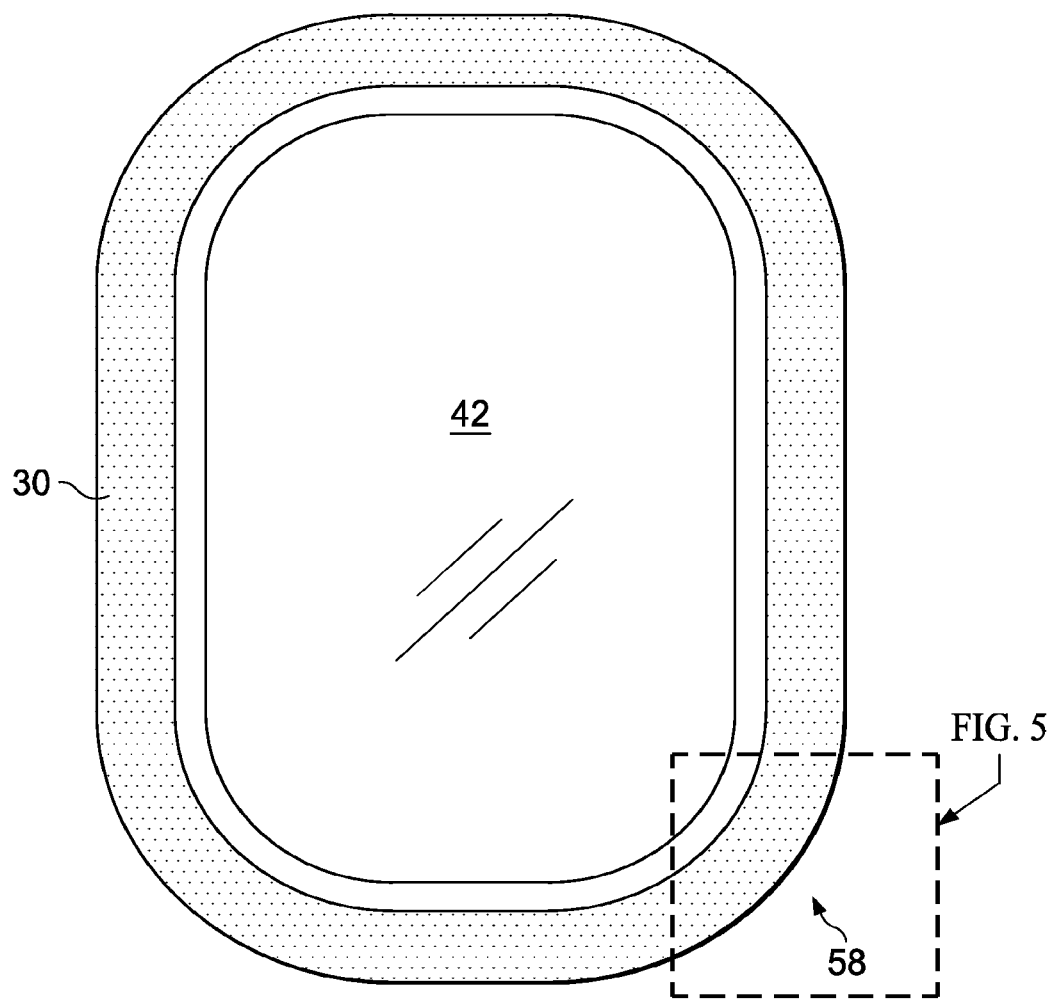
FIG. 4 is an illustration of an elevational view of one of the window openings in the fuselage shown in FIG. 2, also showing a surrounding doubler formed of discontinuous fiber pre-preg.

Attention is now directed to FIGS. 2-6 which illustrate use of the disclosed method and apparatus in connection with the fabrication of an aircraft fuselage 44 (FIG. 2). The fuselage 44 comprises an outer skin 46 supported on internal framework 45 which includes barrel shaped frames 65 and longitudinally extending stringers 47. The skin 46 may include one or more discontinuities, such as window openings 42, cargo doors (not shown), etc. Fuselage pressure 49 results in a hoop load 50 being applied to the circumference 55 of the fuselage 44, passing through the windows 42 or other openings in the skin 46. Further, during flight, the crown 54 of the fuselage 44 is placed under tension 75, while the belly 56 of the fuselage 44 is placed under compression 77, resulting in shear loads 52 (FIG. 3) that must traverse the window openings 42. As shown in FIG. 3, the hoop loads 50 and shear loads 52 are transferred around the perimeter of the window openings 42. Consequently, the corners 58 around the window openings 42 are more highly stressed 59 because they must transfer both the hoop loads 50 and the shear loads 52. As will be discussed below, the disclosed method and apparatus may be employed to layup composite doublers forming an interlaminar pad-up feature 30 around the window openings 42 that stiffens and strengthens the fuselage 44 around the window opening 42, enabling the skin 46 to transfer the required loads through the corners 58.

Figure 5:
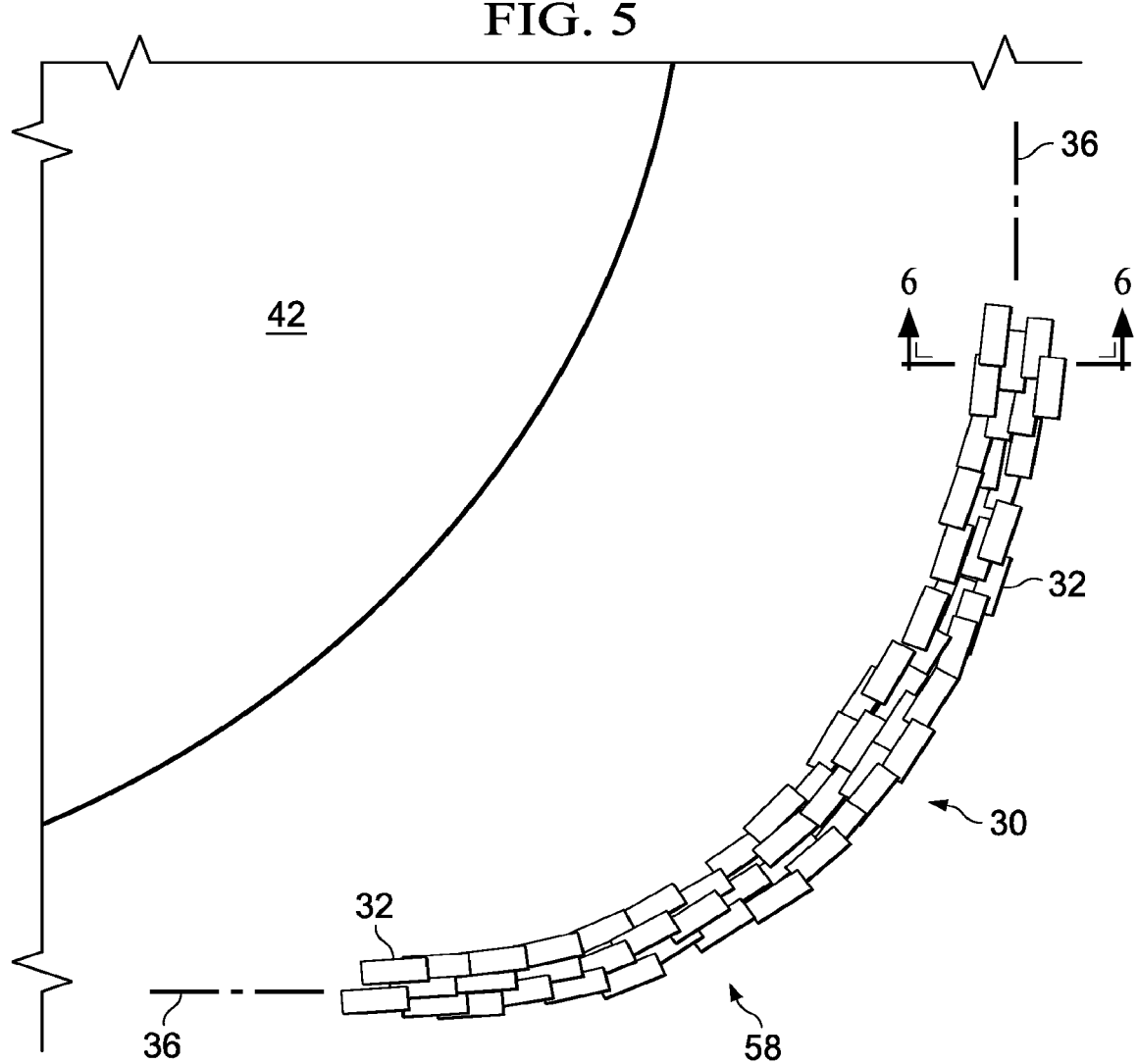
FIG. 5 is an illustration of the area designated as "FIG. 5" in FIG. 4.
Figure 6:
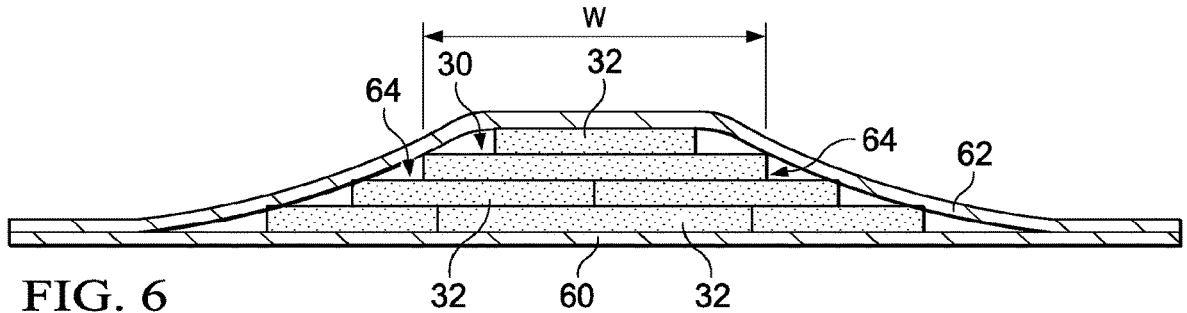
FIG. 6 is an illustration of a sectional view taken along the line 6-6 in FIG. 5.

Referring particularly to FIG. 5, the pad-up feature 30 is formed of a discontinuous fiber pre-preg comprising a plurality of steered fiber pre-preg segments 32 similar to the fiber pre-preg segments 32 previously discussed in connection with FIG. 1. The fiber pre-preg segments 32 are steered as they are being placed on a tool (not shown) or underlying ply (not shown) so that their respective fiber orientations are substantially aligned with structural load paths, which in this example, is along or parallel to a contoured axis 36 at the corners 58. The number of layers or plies of fiber pre-preg segments 32 that are steered onto the substrate 34 will vary with the application, and the desired thickness of the pad-up feature 30. In some applications, it may be desirable to tailor the cross-sectional area of the pad-up feature 30 formed by steering the fiber pre-preg segments 32 onto the substrate 34. For example, referring to FIG. 6, the pad-up feature 30 shown in FIGS. 4 and 5 may be laid up on one or more underlying full plies 60 and may be covered by one or more overlying full plies 62. The pad-up feature 30 comprises a double taper 64 that is formed by laying down layers of the fiber pre-preg segments 32 that are successively narrower in width "W". Tapering of the pad-up feature 30 allows the resulting doubler to better conform to the full plies 60, 62.

Figure 7:
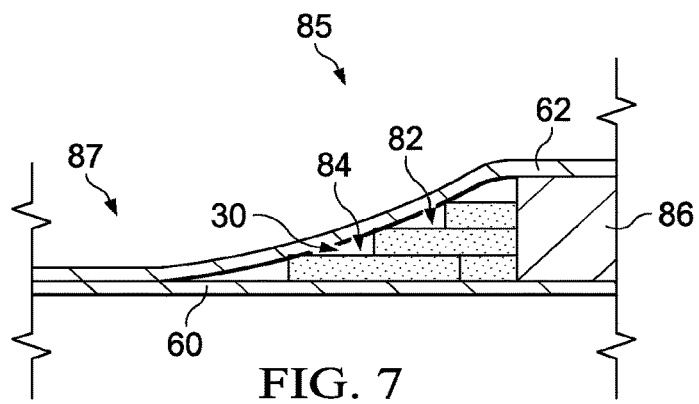
FIG. 7 is an illustration of a cross-sectional view of a composite structure showing a discontinuous interlaminar fiber filler and transition in a gap within the thickness of a composite laminate structure.

For example, referring to FIG. 7, the fiber pre-preg segments 32 may be steered and layered to form cross-sectional shapes that are suitable for filling gaps or voids 82 in a composite laminate, such as gaps 82 that may be formed in transitions in the thickness of a laminate structure 85. In the example shown in FIG. 7, the composite sandwich laminate structure 85 comprises a core 86 sandwiched between two composite plies 60, 62. A gap 82 is formed in the laminate structure 85 as it transitions from the core 86 to a solid laminate 87. The gap 82 forms a structural discontinuity that may require strengthening and reinforcement in order to carry the required loads. The gap 82 may be filled with layers of the fiber pre-preg segments 32 to form a discontinuous fiber pre-preg filler feature 30, which in this example, has a single taper 84.

Figure 8:
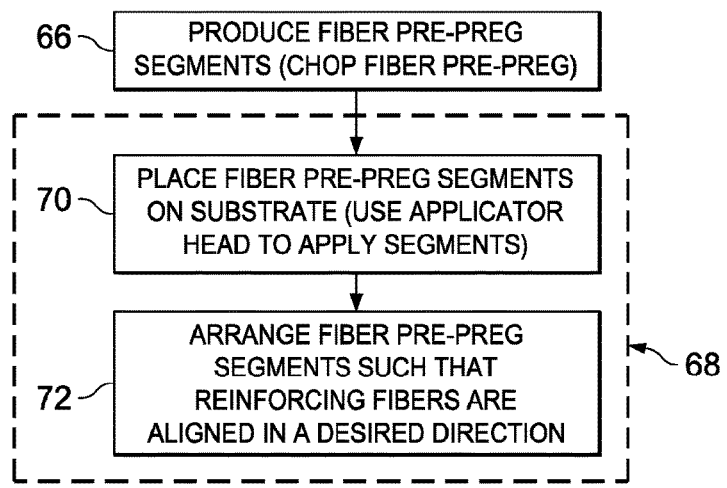
FIG. 8 is an illustration of a flow diagram of a method of laying up interlaminar composite features using the disclosed method.

FIG. 8 illustrates the overall steps of a method of making a discontinuous fiber composite feature 30 by steering fiber pre-preg segments 32 onto a substrate 34. Beginning at 66, fiber pre-preg segments 32 are produced, as by, for example, chopping the fiber pre-preg to a desired dimensions and a desired aspect ratio. At 68, discontinuous fiber plies are laid up by placing the fiber pre-preg segments 32 on a substrate 34 at step 70, and at 72, arranging the fiber pre-preg segments 32 such that the fiber orientations of the reinforcing fibers are aligned in a desired direction. As will be discussed below in more detail, the fiber pre-preg segments 32 may be placed on the substrate 34 using an applicator head which may also be used to steer the fiber pre-preg segments 32 and align them along load paths through a structure.

Attention is now directed to FIGS. 9-11 which illustrate a portion of a frame section 74 having a generally Z-shaped cross-section. The frame section 74 may form a portion of a barrel shaped frame 65 such that used in the fuselage 44 shown in FIG. 1. The frame section 74 includes upper and lower, oppositely extending flanges 76, 78 connected by a web 80. "Mousehole" openings 82 may be provided in the web 80 and flange 76 in order to provide clearance for longitudinally extending stringers 47 (FIG. 2) in the fuselage 44. The disclosed method and apparatus may be employed to form discontinuous resin infused fiber features 30 selectively reinforce portions of the frame section 74, particularly in local areas that may experience higher stresses. Thus, one side of a central portion of the web 80 may be provided with a longitudinally extending, contoured, pad-up feature 30a formed by multiple layers of discontinuous fiber pre-preg comprising fiber pre-preg segments 32 that are steered onto the web 80 as the frame section 74 is being laid up.

In the illustrated embodiment, as is apparent from FIGS. 10 and 11, the pad-up feature 30a varies in cross-sectional shape along its length, however in other embodiments the cross-sectional shape of the pad-up feature 30a may be constant along its length. Similarly, pad-up features 30b, 30c comprising layers of fiber pre-preg segments 32, such as chopped pre-preg, may be steered onto the web 80 in contoured patterns surrounding the mouseholes 82. The pad-up features 30a, 30b, 30c may have any desired cross-sectional geometry selected to optimize local structural properties of the frame section 74. Any of the pad-up features 30b, 30c may vary in cross-sectional size and/or shape along its length.

Figure 12:
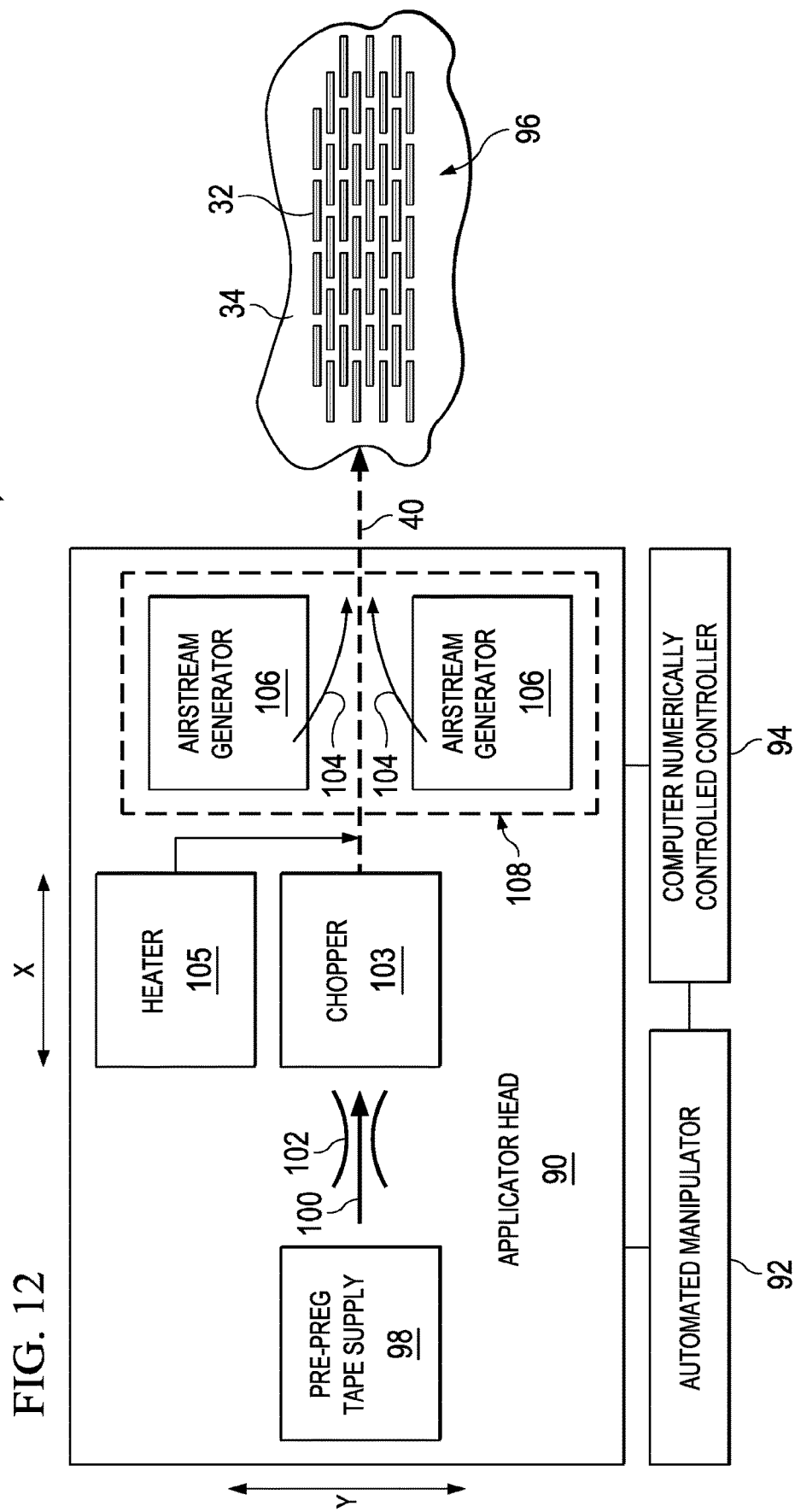
FIG. 12 is an illustration of a combined block and diagrammatic view of a system for placing discontinuous fiber pre-preg.

Attention is now directed to FIG. 12 which illustrates one embodiment of a system 88 that may be employed to form discontinuous, resin infused fiber features 30 of the type previously described, including local features of a structure that may require strengthening, stiffening and/or reinforcement. The system 88 broadly comprises an applicator head 90 that is adapted to place fiber pre-preg segments 32, such as chopped pre-preg 32, onto a substrate 34, forming multiple layers or plies 96. Applicator head 90 is displaced in X, Y and Z directions over the substrate 34 by an automated manipulator 92 which may comprise, for example and without limitation, a robot.

The manipulator 92 as well as the applicator head 90 are operated by a programmed CNC (computer numerically controlled) controller 94. The applicator head 90 includes a pre-preg tape supply 98 which supplies unidirectional fiber pre-preg tape 100 through guides 102 to a chopper 103. The chopper 103 may comprise a conventional cutter mechanism (not shown) operated in synchronization with the movement the applicator head 90 to chop the pre-preg fiber tape 100 into fiber pre-preg segments of the desired size and shape. The chopped fiber pre-preg segments 32 are fed 40 into an airstream 104 generated by airstream generators 106 on the applicator head 90. The airstream 104 propels and places the pre-aligned fiber pre-preg segments 32 through a nozzle 108 onto the substrate 34 as the applicator head 90 over the substrate 34. The pre-preg segments 32 are applied to the substrate 34 in the desired orientation as they contact and adhere to the substrate 34. Orienting the segments 32 as they are being placed on the substrate 34 may eliminate the need to subsequently adjust the orientation of the segments 32. A heater 105 may be provided on the applicator head 90 in order to heat the pre-preg fiber segments 32 and thereby increase their tackiness. This increased tack may assist in adhering and holding the pre-preg fiber segments 32 in a desired orientation on the substrate 34. The heater 105 may comprise any of a variety of devices suitable for the application, including but not limited to a hot air blower, a conduction rod, a focused infrared heater or a laser, to name only a few. The heater 105 may generally heat the entire area of the segments 32, or may produce a focused beam (not shown), such as a laser beam, that heats only a portion of a segment 32 until it is "sticky" enough to adhere to the substrate when it is placed.

The applicator head 90 may move from side-to-side (in the Y direction) in order to apply a width of the chopped pre-preg segments 32 in a desired orientation, while in other embodiments, the applicator head 90 may be used to make multiple linear passes over the substrate 34 in the X direction, in order to cover a desired width of the substrate 34 with the chopped fiber pre-preg segments 32 for each layer or ply 96. While the applicator head 90 has been illustrated with airstream generators 106 to place the fiber pre-preg segments 32, other means such as mechanical mechanisms may be employed to dispense, place and align the fiber pre-preg segments 32, as the applicator head 90 moves across, and steers the fiber pre-preg segments 32 onto the substrate 34. It should be particularly noted here that the system 88, including the applicator head 90 discussed above are merely illustrative of a wide variety of equipment may be used to place and position the pre-preg segments 32. The particular form of the system 88 that is used will depend upon the application, including specific structural requirements and the layup techniques that are employed. Moreover, the fabrication of the pre-preg segments 32 and equipment used to place and position the segments 32 on a substrate 34 may be implemented using a single machine, or several different machines.

Figure 13:
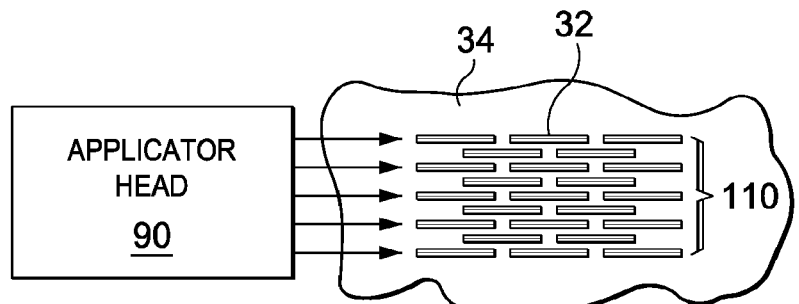
FIG. 13 is an illustration of a combined block and diagrammatic view of an alternate embodiment of the system for placing discontinuous fiber pre-preg.

FIG. 13 illustrates an alternate embodiment of the applicator head 90 shown in FIG. 12, in which multiple rows of individual chopped fiber pre-preg segments 32 may be simultaneously dispensed, aligned in a desired orientation and placed by the applicator head 90 to form a bandwidth 110 of segments 32 with each pass of the applicator head 90 across the substrate 34.

Figure 14:
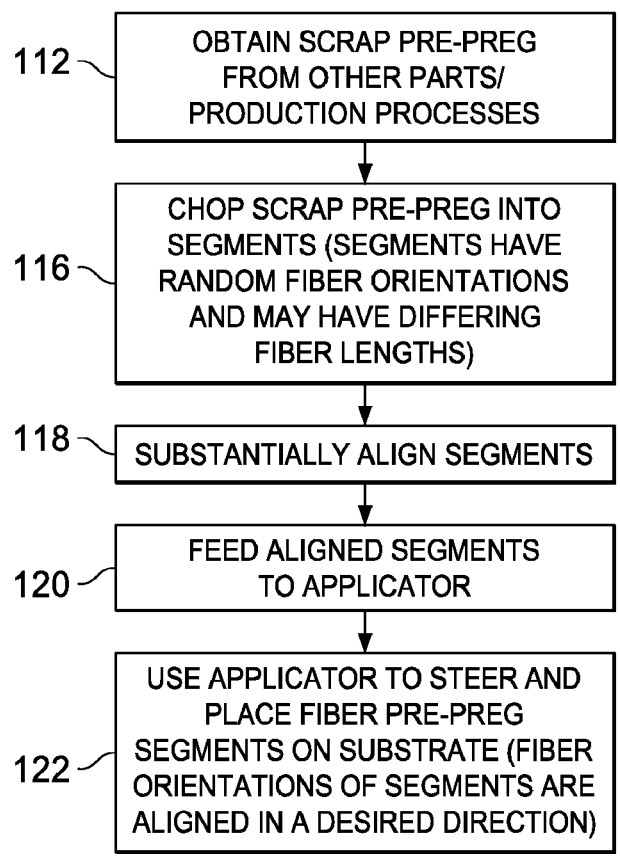
FIG. 14 is an illustration of a flow diagram of a method of laying up composite laminates using discontinuous fiber pre-preg derived from pre-preg scrap.
Figure 15:
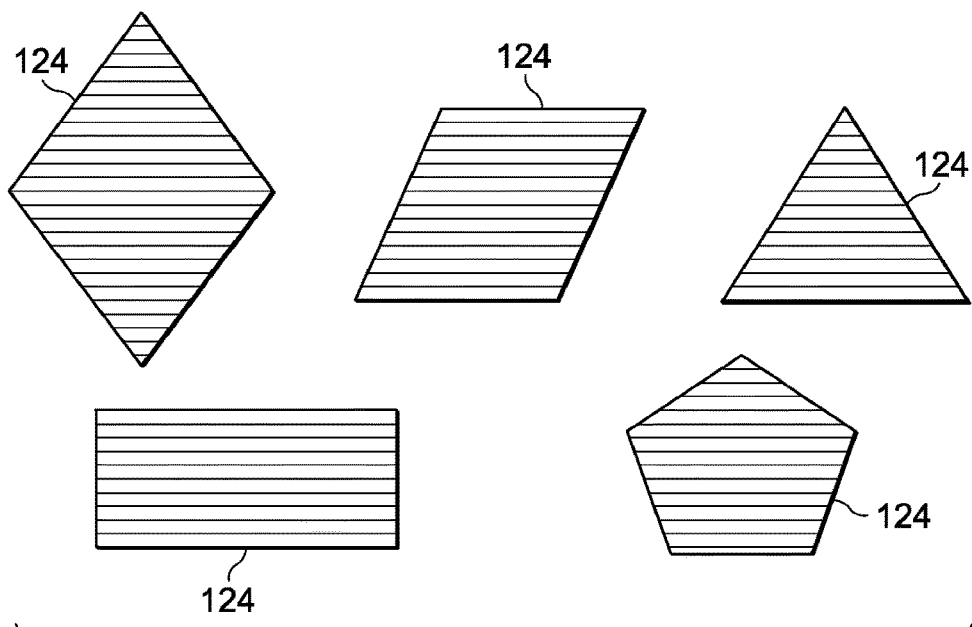
FIG. 15 is an illustration of a plan view showing various shapes of pre-preg scrap that may be used in the method shown in FIG. 14.
Figure 16:
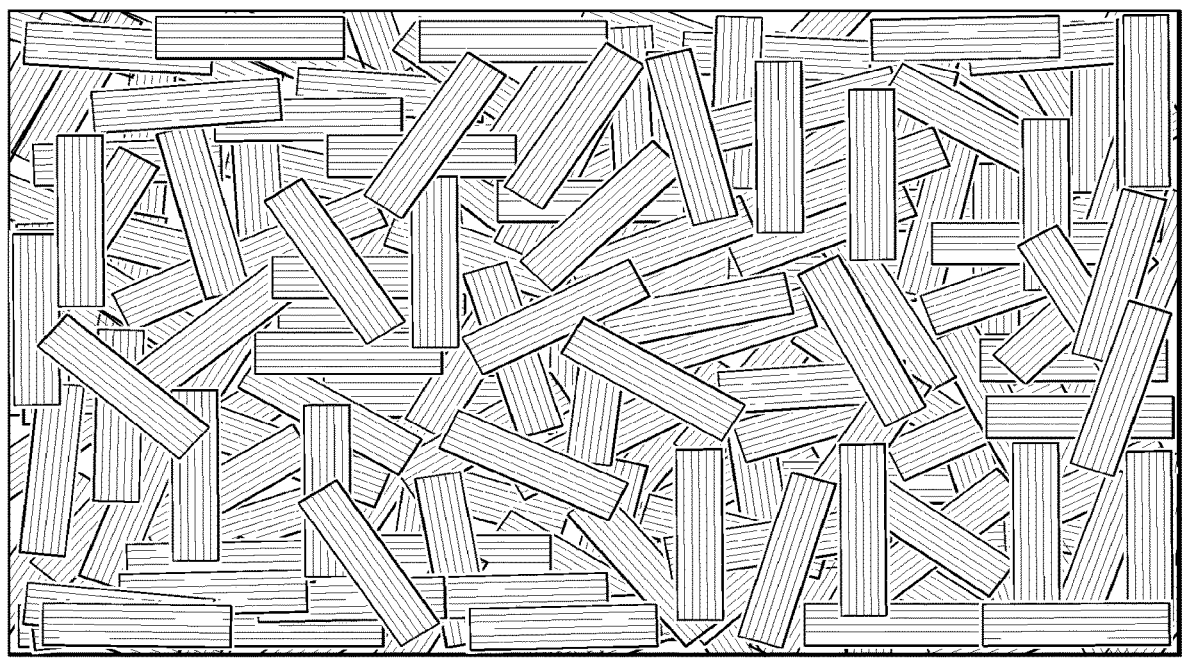
FIG. 16 is an illustration of a plan view showing randomly oriented, fiber pre-preg segments formed by chopping the scrap shown in FIG. 15.
Figure 17:
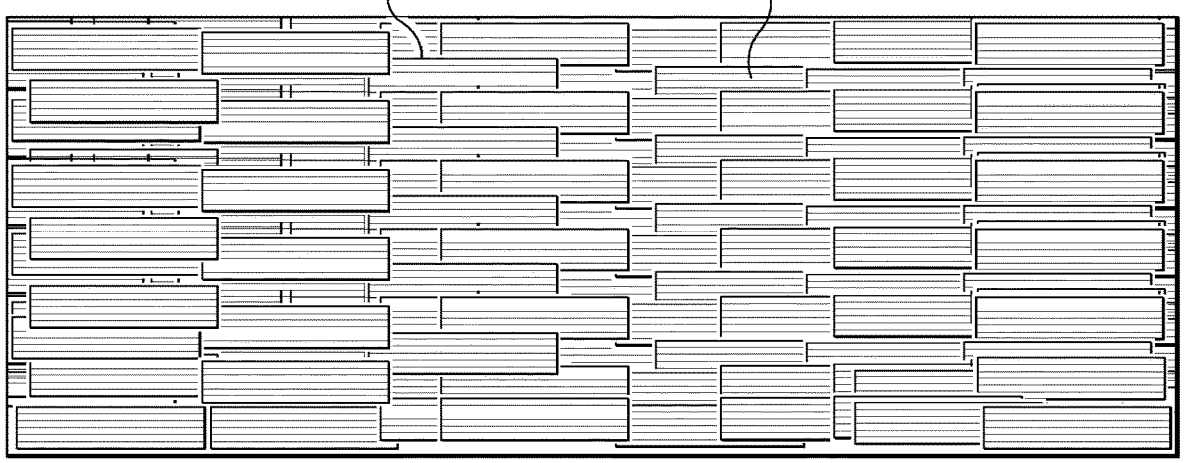
FIG. 17 is an illustration of a plan view similar to FIG. 16, but showing the fiber orientations of the fiber pre-preg segments having been aligned in preparation for application to a substrate.

Referring now to Figures of 14-17, the disclosed embodiments may be employed to layup layers or plies of discontinuous fiber pre-preg using scrap pre-preg 124 (FIG. 15). Referring to FIG. 14, as shown at step 112, the scrap pre-preg 124 may be obtained from non-conforming/scrap parts or from scrap pre-preg resulting from other production processes. The scrap pre-preg 124 may have any of various shapes, as shown in FIG. 15. At step 116 shown in FIG. 14, the scrap pre-preg 124 is chopped into individual fiber pre-preg segments 32, and following this chopping process, the segments 32 may have a random fiber orientation 126, as shown in FIG. 16 and/or may have fibers of differing lengths. At step 118, the chopped fiber pre-preg segments 32 are substantially aligned 128 with a desired fiber orientation as shown in FIG. 17. At step 120, the aligned fiber pre-preg segments 32 are fed to an applicator. At step 122 the applicator is used to dispense, steer and place the fiber pre-preg segments 32 on the substrate 34, such that fiber orientations of the fiber pre-preg segments 32 are aligned in a desired direction.

The chopped fiber pre-preg 32 derived from scrap that is used in the disclosed method may be produced using any of several processes. For example, referring to FIG. 18, scrap pre-preg 124 may be introduced into a chopper device 130 which may be similar to a blender, having rotating blades 132 inside an open vessel 135. The blades 132 chop and break the scrap fiber pre-preg 124 into individual fiber pre-preg segments 32, breaking or splitting the pre-preg along the lines of, and between the reinforcing fibers, resulting in the fiber pre-preg segments that have a random orientation 126. With the scrap pre-preg having been chopped into individual fiber pre-preg segments 32, the randomly oriented 126 fiber pre-preg segments 32 are aligned, for example by placing them in a shaker tray 134 having a series of parallel channels 136. The shaker tray 134 is vibrated side-to-side 138, causing the randomly oriented 126 fiber pre-preg segments 32 that have been loaded onto the tray 134 to fall into and align themselves within the channels 136, resulting in rows 140 of aligned, fiber pre-preg segments 32. The aligned rows 140 of the fiber pre-preg segments 32 may be fed to an applicator head 90 which dispenses, places and steers the fiber pre-preg segments 32 on the substrate 34 with desired fiber orientations.

FIGS. 19A-21B illustrate another embodiment of a method of steering chopped fiber pre-preg segments 32 onto a substrate 34. As shown in FIGS. 19A-19B, an applicator 140 is used to apply 142 a suitable resin 144 onto the substrate 34, as the applicator 140 moves 150 across the substrate 34. The resin 144 may be applied by spraying the resin 144 onto the substrate 34, rolling the resin 144 onto the substrate 34 or using other application techniques. Next, as shown in FIGS. 20A-20B, chopped fiber pre-preg segments 32 are applied to the substrate 34 by a suitable applicator 146 that moves 150 over the substrate 34. When initially applied in this manner, the fiber pre-preg segments 32 may have random orientations, as shown in FIG. 20B. Then, as shown in FIGS. 21A and 21B, a fiber segment aligner 148 is moved 150 over the substrate 34 to align the fiber pre-preg segments 32 in a desired direction, which in this case, is along axis 36. The fiber segment aligner 148 may use one or more mechanical devices to contact and realign the fiber pre-preg segments 32, or alternatively may use noncontact techniques, such as an airstream (not shown) to achieve the desired segment alignment. As previously discussed, however, orienting the segments 32 as they are being initially placed on the substrate 34 may be desirable in some applications, since this technique may eliminate the need for the additional step of repositioning the segments 32 to the desired fiber orientations.

FIGS. 22A-24B illustrate an alternate technique for placing and aligning the fiber pre-preg segments 32 on the substrate 34. Referring to FIGS. 22A and 22B, a small quantity, such as a drop, of resin 152 is placed on one end 154 of each of the fiber pre-preg segments 32. Then, as shown in FIGS. 23A-23B, the fiber segment 32 is placed on the substrate 34. At this point, the fibers of the fiber segment 32 may not be aligned with the desired orientation, such as axis 36. As shown in FIGS. 24A-24B, the fiber segment 32 is then rotated 156 so that the fiber orientation of the fiber segment 32 is aligned with the axis 36. The orientation process may be performed using mechanical devices 49, or using noncontact techniques such as streaming air over the substrate 34.

Embodiments of the disclosure may find use in a variety of potential applications, particularly in the transportation industry, including for example, aerospace, marine, automotive applications and other application where composite structures may require local features requiring tight contours, thickness control and/or cross-sectional tailoring. Thus, referring now to FIGS. 25 and 26, embodiments of the disclosure may be used in the context of an aircraft manufacturing and service method 158 as shown in FIG. 25 and an aircraft 160 as shown in FIG. 26. Aircraft applications of the disclosed embodiments may include, for example, without limitation, various parts of the airframe 176 such as frames, beams, spars, and stringers to name only a few. During pre-production, exemplary method 158 may include specification and design 162 of the aircraft 160 and material procurement 164. During production, component and subassembly manufacturing 166 and system integration 168 of the aircraft 160 takes place. Thereafter, the aircraft 160 may go through certification and delivery 170 in order to be placed in service 172. While in service by a customer, the aircraft 160 is scheduled for routine maintenance and service 174, which may also include modification, reconfiguration, refurbishment, repair and so on.

Each of the processes of method 158 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 26, the aircraft 160 produced by exemplary method 158 may include an airframe 176 with a plurality of systems 178 and an interior 180. Examples of high-level systems 178 include one or more of a propulsion system 182, an electrical system 184, a hydraulic system 188, and an environmental system 190. Any number of other systems may be included. Although an aerospace example is shown, the principles of the disclosure may be applied to other industries, such as the marine and automotive industries.

Systems and methods embodied herein may be employed during any one or more of the stages of the production and service method 158. For example, components or subassemblies corresponding to production process 166 may be fabricated or manufactured in a manner similar to components or subassemblies produced while the aircraft 160 is in service. Also, one or more apparatus embodiments, method embodiments, or a combination thereof may be utilized during the production stages 166 and 168, for example, by substantially expediting assembly of or reducing the cost of an aircraft 160. Similarly, one or more of apparatus embodiments, method embodiments, or a combination thereof may be utilized while the aircraft 160 is in service, for example and without limitation, to perform maintenance and service 174, or to carry out repair or refurbishment of structures at any time during the service life of the aircraft 160.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination of items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of forming a composite feature having discontinuous reinforcement fibers, comprising:
producing a plurality of resin infused fiber segments each having a plurality of unidirectional reinforcing fibers;
placing the resin infused fiber segments on a substrate, wherein placing the resin infused fiber segments on the substrate is performed by introducing the resin infused fiber segments into an airstream, and using the airstream to propel the resin infused fiber segments through a nozzle on an applicator head onto the substrate; and
arranging the resin infused fiber segments such that the reinforcing fibers of the resin infused fiber segments placed on the substrate are substantially aligned relative to a desired reference orientation by rotating the resin infused fiber segments after the resin infused fiber segments have been placed on the substrate.

2. The method of claim 1, wherein:
producing the resin infused fiber segments includes chopping scrap fiber pre-preg into the plurality of resin infused fiber segments each having the plurality of unidirectional reinforcing fibers.

3. The method of claim 1, wherein producing the resin infused fiber segments is performed by splitting fiber pre-preg along and between the reinforcing fibers into individual pieces.

4. The method of claim 1, wherein placing the resin infused fiber segments on the substrate includes:
moving the applicator head over the substrate, and
dispensing the resin infused fiber segments from the applicator head onto the substrate as the applicator head moves over the substrate.

5. The method of claim 4, wherein producing the resin infused fiber segments is performed by:

drawing continuous fiber pre-preg tape from a pre-preg tape supply on the applicator head, and chopping the pre-preg tape into the resin infused fiber segments as the resin infused fiber segments are being dispensed from the applicator head onto the substrate.

6. The method of claim 4, wherein dispensing the resin infused fiber segments from the applicator head includes dispensing a bandwidth of the resin infused fiber segments onto the substrate.

7. A method of laying up composite material on a substrate, comprising:

placing individual chopped fiber pre-preg segments on the substrate, wherein each of the individual chopped fiber pre-preg segments comprises a plurality of reinforcing fibers, and wherein placing the pre-preg segments on the substrate is performed by introducing the pre-preg segments into an airstream, and using the airstream to propel the pre-preg segments through a nozzle on an applicator head onto the substrate; and controlling an orientation of the pre-preg segments on the substrate by rotating the pre-preg segments after the pre-preg segments have been placed on the substrate.

8. The method of claim 7, wherein placing the pre-preg segments on the substrate is performed by:

moving the applicator head over the substrate along a desired path, and dispensing the pre-preg segments from the applicator head onto the substrate as the applicator head moves over the substrate.

9. A method of laying up a composite structure, comprising:

producing a plurality of resin infused fiber segments each having a plurality of unidirectional reinforcing fibers;

moving an applicator head over a substrate;

generating an airstream by an airstream generator on the applicator head;

introducing the resin infused fiber segments into the airstream, and using the airstream to propel the resin infused fiber segments through a nozzle on the applicator head onto the substrate as the applicator head moves over the substrate; and arranging the resin infused fiber segments such that the reinforcing fibers of the resin infused fiber segments placed on the substrate are substantially aligned relative to a desired reference orientation by rotating the resin infused fiber segments.

10. The method of claim 9, wherein the step of moving the applicator head over the substrate comprises moving the applicator head along a preselected path over the substrate by a computer controlled manipulator.

11. The method of claim 9, wherein producing the plurality of resin infused fiber segments comprises:

supplying pre-preg fiber tape from a pre-preg tape supply on the applicator head to a chopper on the applicator head; and chopping the pre-preg fiber tape by the chopper to form the resin infused fiber segments.

12. The method of claim 11 further comprising synchronizing the chopping of the pre-preg fiber tape by the chopper with the moving of the applicator head over the substrate.

13. The method of claim 9 further comprising heating the resin infused fiber segments by a heater on the applicator head.

14. The method of claim 7 further comprising:

placing a drop of resin on one end of each of the pre-preg segments before placing the pre-preg segments on the substrate; and rotating the pre-preg segments about the drop of resin after the pre-preg segments have been placed on the substrate.

15. The method of claim 1 further comprising:

placing a drop of resin on one end of each of the resin infused fiber segments before placing the resin infused fiber segments on the substrate; and rotating the resin infused fiber segments about the drop of resin after the resin infused fiber segments have been placed on the substrate.

16. The method of claim 4, wherein the step of moving the applicator head over the substrate comprises moving the applicator head along a preselected path over the substrate by a computer controlled manipulator.

17. The method of claim 7 further comprising:

producing the chopped fiber pre-preg segments by chopping scrap fiber pre-preg into the chopped fiber pre-preg segments each having the plurality of reinforcing fibers.

18. The method of claim 7 further comprising producing the chopped fiber pre-preg segments by:

drawing continuous fiber pre-preg tape from a pre-preg tape supply on the applicator head, and chopping the pre-preg tape into the chopped fiber pre-preg segments as the resin infused fiber segments are being dispensed from the applicator head onto the substrate.

19. The method of claim 9 further comprising:

placing a drop of resin on one end of each of the resin infused fiber segments before placing the resin infused fiber segments on the substrate; and rotating the resin infused fiber segments about the drop of resin after the resin infused fiber segments have been placed on the substrate.

20. The method of claim 9, wherein:

producing the resin infused fiber segments includes chopping scrap fiber pre-preg into the plurality of resin infused fiber segments each having the plurality of unidirectional reinforcing fibers.

* * * * *